US009555509B2

(12) United States Patent
Woiceshyn et al.

(10) Patent No.: US 9,555,509 B2
(45) Date of Patent: Jan. 31, 2017

(54) METHOD FOR PRODUCING WELLBORE SCREEN WITH TRACER FOR FLUID DETECTION

(71) Applicants: ABSOLUTE COMPLETION TECHNOLOGIES LTD., Calgary (CA); RESMAN AS, Trondheim (NO)

(72) Inventors: Glenn Edward Woiceshyn, Calgary (CA); Fridtjof Nyhavn, Trondheim (NO)

(73) Assignees: ABSOLUTE COMPLETION TECHNOLOGIES LTD., Calgary (CA); RESMAN AS, Ranheim (NO)

( * ) Notice: Subject to any disclaimer, the term of this patent is extended or adjusted under 35 U.S.C. 154(b) by 383 days.

(21) Appl. No.: 14/133,077

(22) Filed: Dec. 18, 2013

(65) Prior Publication Data

US 2014/0101918 A1    Apr. 17, 2014

Related U.S. Application Data

(60) Division of application No. 13/711,307, filed on Dec. 11, 2012, now Pat. No. 9,102,018, which is a
(Continued)

(51) Int. Cl.
*B23P 19/04*      (2006.01)
*B01D 29/11*      (2006.01)
(Continued)

(52) U.S. Cl.
CPC .............. *B23P 19/04* (2013.01); *B01D 29/111* (2013.01); *B01D 35/02* (2013.01); *E21B 43/08* (2013.01);
(Continued)

(58) Field of Classification Search
CPC ....... B23P 19/04; E21B 47/1015; E21B 43/08; B01D 29/111; B01D 35/02; Y10T 29/49604; Y10T 29/49826
See application file for complete search history.

(56) References Cited

U.S. PATENT DOCUMENTS

| 1,256,830 A | 2/1918 | Rodrigo, Sr. |
| 1,473,644 A | 11/1923 | Rodrigo, Sr. |
(Continued)

FOREIGN PATENT DOCUMENTS

| BG | 31730 | 3/1982 |
| CA | 2255071 | 6/1999 |
(Continued)

OTHER PUBLICATIONS

Notification of Transmittal of International Search Report, International Search Report and Written Opinion in International Application No. PCT/CA2011/000699 mailed Sep. 2, 2011.
(Continued)

Primary Examiner — Ryan J Walters
(74) Attorney, Agent, or Firm — Arent Fox LLP

(57) ABSTRACT

A wellbore screen including: an apertured base pipe; an intermediate filtering layer including a plurality of metal fibers wrapped helically around the apertured base pipe and a fluid tracing filament wrapped helically about the apertured base pipe, the fluid tracing filament including a filament structure and a tracer carried by the filament structure, the tracer being entrainable produced fluids in a wellbore environment; and an outer apertured shell over the intermediate layer. A method for producing a wellbore screen, the method comprising: forming a filter tube by wrapping an intermediate layer, including a metal wool fiber strip and a fluid tracing filament, about an apertured base pipe in a helical arrangement under tension; positioning the filter tube
(Continued)

within the long bore of an outer apertured sleeve; and securing the outer apertured sleeve and the filter tube together.

15 Claims, 4 Drawing Sheets

Related U.S. Application Data continuation of application No. PCT/CA2011/000699, filed on Jun. 13, 2011.

(60) Provisional application No. 61/353,983, filed on Jun. 11, 2010.

(51) Int. Cl.
  *B01D 35/02* (2006.01)
  *E21B 43/08* (2006.01)
  *E21B 47/10* (2012.01)

(52) U.S. Cl.
  CPC ...... *E21B 47/1015* (2013.01); *Y10T 29/49604* (2015.01); *Y10T 29/49826* (2015.01)

(56) References Cited

U.S. PATENT DOCUMENTS

| | | |
|---|---|---|
| 1,488,753 A | 4/1924 | Kelly |
| 1,750,871 A | 3/1930 | Wilson |
| 2,391,609 A | 12/1945 | Wright |
| 2,401,035 A | 5/1946 | Akeyson el al. |
| 2,540,123 A | 2/1951 | Kinley |
| 2,798,768 A | 9/1957 | Babin |
| 2,981,332 A | 4/1961 | Miller |
| 3,177,945 A | 4/1965 | Fetter |
| 3,213,950 A | 10/1965 | Ghelft et al. |
| 3,273,641 A | 9/1966 | Bourne |
| 3,299,831 A | 1/1967 | Watson et al. |
| 3,322,199 A | 5/1967 | Van Note, Jr. |
| 4,706,751 A | 11/1987 | Gondouin |
| 5,310,000 A | 5/1994 | Arterbury et al. |
| 5,526,881 A | 6/1996 | Martin et al. |
| 5,551,513 A | 9/1996 | Surles et al. |
| 5,636,661 A | 6/1997 | Moyes |
| 5,664,628 A | 9/1997 | Koehler |
| 5,711,879 A | 1/1998 | Carlson |
| 5,816,742 A | 10/1998 | Cordewener |
| 5,955,144 A | 9/1999 | Sinclair |
| 6,006,829 A | 12/1999 | Whitlock |
| 6,012,522 A | 1/2000 | Donnelly et al. |
| 6,202,750 B1 | 3/2001 | Ohanesian |
| 6,561,732 B1 | 5/2003 | Bloomfield et al. |
| 6,645,769 B2 | 11/2003 | Tayebi |
| 6,702,044 B2 | 3/2004 | Reddy et al. |
| 6,799,634 B2 | 10/2004 | Hartog et al. |
| 7,049,272 B2 | 5/2006 | Sinclair |
| 7,258,166 B2 | 8/2007 | Russell |
| 7,581,586 B2 | 9/2009 | Russell |
| 7,861,787 B2 | 1/2011 | Russell |
| 2001/0042620 A1 | 11/2001 | Ohanesian |
| 2002/0020527 A1 | 2/2002 | Kilaas et al. |
| 2004/0084186 A1 | 5/2004 | Allison |
| 2004/0231845 A1 | 11/2004 | Cooke, Jr. |
| 2005/0056425 A1 | 3/2005 | Grigsby et al. |
| 2006/0011345 A1 | 1/2006 | Delaloye et al. |
| 2007/0246212 A1 | 10/2007 | Richards |
| 2007/0256834 A1 | 11/2007 | Hopkins et al. |
| 2008/0006402 A1 | 1/2008 | Russell |
| 2011/0024111 A1 | 2/2011 | Moen et al. |
| 2011/0257887 A1 | 10/2011 | Cooper et al. |

FOREIGN PATENT DOCUMENTS

| | | |
|---|---|---|
| DE | 1301300 | 8/1969 |
| DE | 10031663 | 8/2001 |
| EP | 1416118 | 5/2004 |
| FR | 2906561 | 4/2008 |
| RU | 2347890 C2 | 2/2009 |
| RU | 2361069 C2 | 7/2009 |
| SU | 941548 A | 7/1982 |
| WO | 2005056977 | 6/2005 |
| WO | 2006004426 A1 | 1/2006 |
| WO | 2011153635 | 12/2011 |
| WO | 2011153636 | 12/2011 |

OTHER PUBLICATIONS

Introduction to STARS Screens, Absolute Engineering Inc., presented prior to Dec. 10, 2003.
Notification of International Search Report, International Search Report and Written Opinion in International Application No. PCT/CA2011/000698 mailed Aug. 18, 2011.
IPRP dated Dec. 14, 2012 and Written Opinion dated Sep. 2, 2011 regarding International Application No. PCT/CA2011/000699.
Decision to Grant dated Jul. 31, 2015 regarding Russian Application No. RU2013101004.

METHOD FOR PRODUCING WELLBORE SCREEN WITH TRACER FOR FLUID DETECTION

CROSS-REFERENCE

This patent application is a divisional of U.S. Non-Provisional patent application Ser. No. 13/711,307, filed Dec. 11, 2012, which is a continuation of International Patent Application No. PCT/CA2011/000699, filed Jun. 13, 2011, which claims the benefit to U.S. Provisional Application No. 61/353,983, filed Jun. 11, 2010, the entirety of all three applications are incorporated herein by reference.

BACKGROUND OF THE INVENTION

Wellbore screens may be used to filter out sand and like particulate impurities from the produced fluid before the fluid is pumped to the surface. If some form of filter is not provided for fluid entering the well, sand and other impurities entrained in the fluid may materially reduce the effective life of the well pump and/or other apparatus to which the well is connected.

SUMMARY OF INVENTION

In accordance with a broad aspect of the invention, there is provided a wellbore screen including an apertured base pipe; an intermediate filtering layer including a plurality of metal fibers wrapped helically around the apertured base pipe and a fluid tracing filament wrapped helically about the apertured base pipe, the fluid tracing filament including a filament structure and a tracer carried by the filament structure, the tracer being entrainable in produced fluids in a wellbore environment; and an outer apertured shell over the intermediate layer.

In accordance with another broad aspect of the present invention, there is provided a method for producing a wellbore screen, the method including forming a filter tube by wrapping an intermediate layer, including a metal wool fiber strip and a fluid tracing filament, about an apertured base pipe in a helical arrangement under tension; positioning the filter tube within the long bore of an outer apertured sleeve; and securing the outer apertured sleeve and the filter tube together.

It is to be understood that other aspects of the present invention will become readily apparent to those skilled in the art from the following detailed description, wherein various embodiments of the invention are shown and described by way of illustration. As will be realized, the invention is capable for other and different embodiments and its several details are capable of modification in various other respects, all without departing from the spirit and scope of the present invention. Accordingly the drawings and detailed description are to be regarded as illustrative in nature and not as restrictive.

BRIEF DESCRIPTION OF THE DRAWINGS

A further, detailed, description of the invention, briefly described above, will follow by reference to the following drawings of specific embodiments of the invention. These drawings depict only typical embodiments of the invention and are therefore not to be considered limiting of its scope. In the drawings.

DESCRIPTION OF VARIOUS EMBODIMENTS

Figure 1:
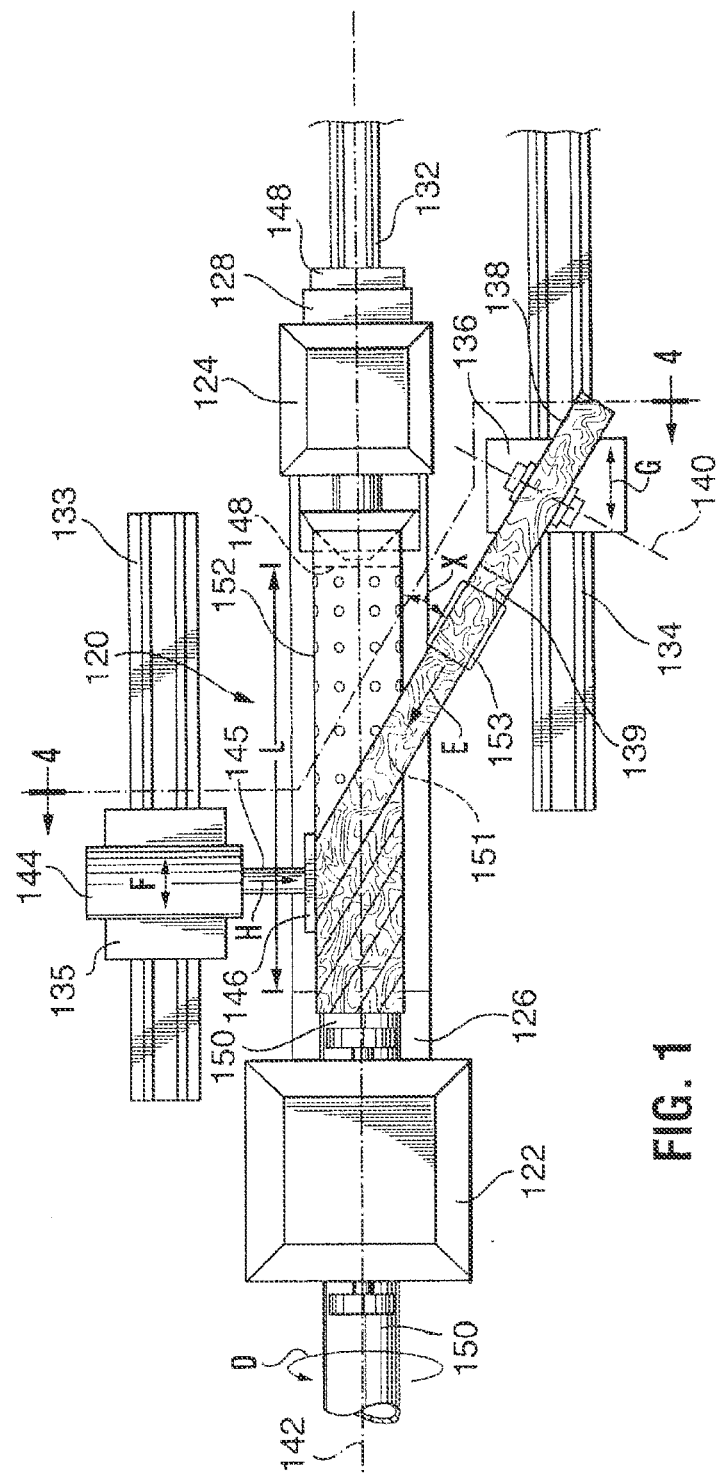
FIG. 1 is a simplified, partly diagrammatic plan view of an intermediate stage in one possible embodiment of the manufacturing method of the present invention.

The description that follows and the embodiments described therein, are provided by way of illustration of an example, or examples, of particular embodiments of the principles of various aspects of the present invention. These examples are provided for the purposes of explanation, and not of limitation, of those principles and of the invention in its various aspects. In the description, similar parts are marked throughout the specification and the drawings with the same respective reference numerals. The drawings are not necessarily to scale and in some instances proportions may have been exaggerated in order more clearly to depict certain features.

Figure 2:
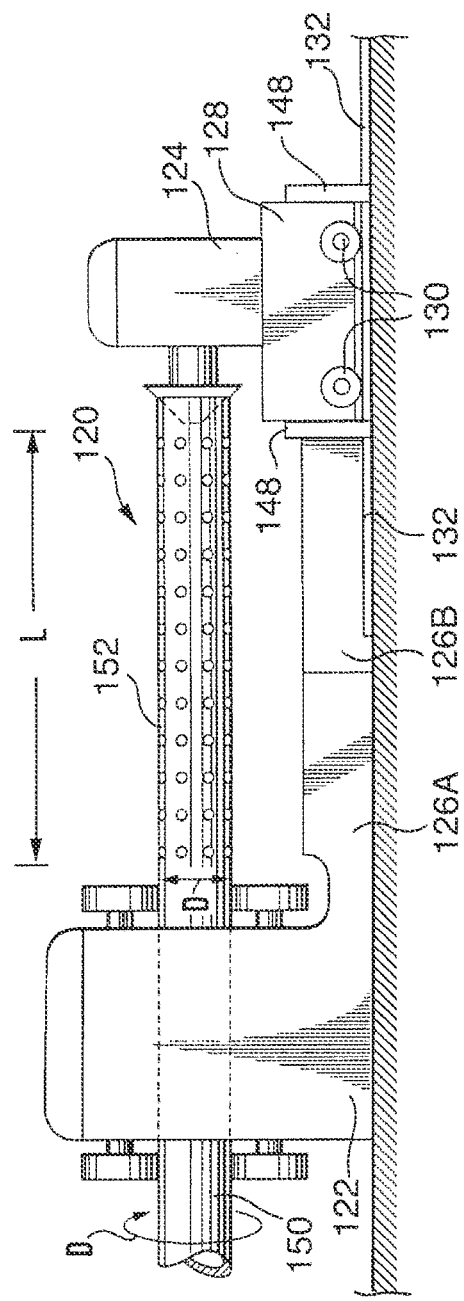
FIG. 2 is a simplified elevation view of the apparatus of FIG. 1 with a part of that apparatus omitted to facilitate understanding.

FIGS. 1 and 2 are simplified, schematic illustrations of one possible embodiment of an apparatus for manufacture of a wellbore screen suitable for use in the production tubing of a subterranean fluid well, pursuant to the present invention. The apparatus of FIGS. 1 and 2 comprises an engine lathe 120 including a head stock 122 spaced from a tail-stock 124 at opposite ends of a bed 126, FIG. 1. Lathe bed 126 may include sections 126A and 126B; see FIG. 2. The tail-stock 124 of lathe 120 may be mounted on a carriage 128 in turn supported by wheels 130 engaging a guide rail 132.

The illustrated apparatus further includes one or more additional guide rails 133 and 134 that are parallel to but spaced from guide rail 132. There are also one or more carriages 135 and 136 that move along and are guided by rails 133 and 134, respectively. Carriage 136 supports a supply roll 138 of a strip 139 of metal filter wool; the metal wool strip is described more fully hereinafter. The axis 140 of roll 138 is aligned, on carriage 136, so that strip 139 is at an acute angle X relative to the axis 142 of lathe 120 and the surface onto which it is to be applied. The carriage 135 on rail 133 supports a fluid pressure cylinder 144 having a piston rod 145 that carries a pressure plate 146 that is further described hereinafter. Two stop members 148 may be provided to assure accurate positioning of tail stock carriage along rail 132.

In other embodiments, rollers may be employed to ride along the screen and apply compressive force to the screen fibers as they are laid down. A guide may be employed to guide the fibers to the screen.

The first step, in the method of the invention, is to provide a preselected length of an apertured base pipe 150, which serves as the central support for the wellbore screen. Base pipe is selected eventually to be connectable into a longer pipe that is subsequently to serve as the production tubing for a subterranean well. Base pipe 150 is apertured along a section 152 thereof to permit fluid flow through the side wall of the pipe between its outer surface and its inner bore. Apertures may be in various forms and arrangements including perforations, channels, slots, underlay, nozzles, etc. For example, the apertures may allow for open, unrestricted fluid flow or controlled flow, for example as by use of ICD technology. In FIGS. 1 and 2, the apertured portion has a length L. Length L usually exceeds one foot (25.4 cm) but may be shorter. Generally, length L is always much greater than the outer diameter of the base pipe. At the outset, pipe 150 is mounted in lathe 120 with the apertured section 152 of the pipe positioned between head stock 122 and tail stock 124, as shown in FIGS. 1 and 2.

Figure 3:
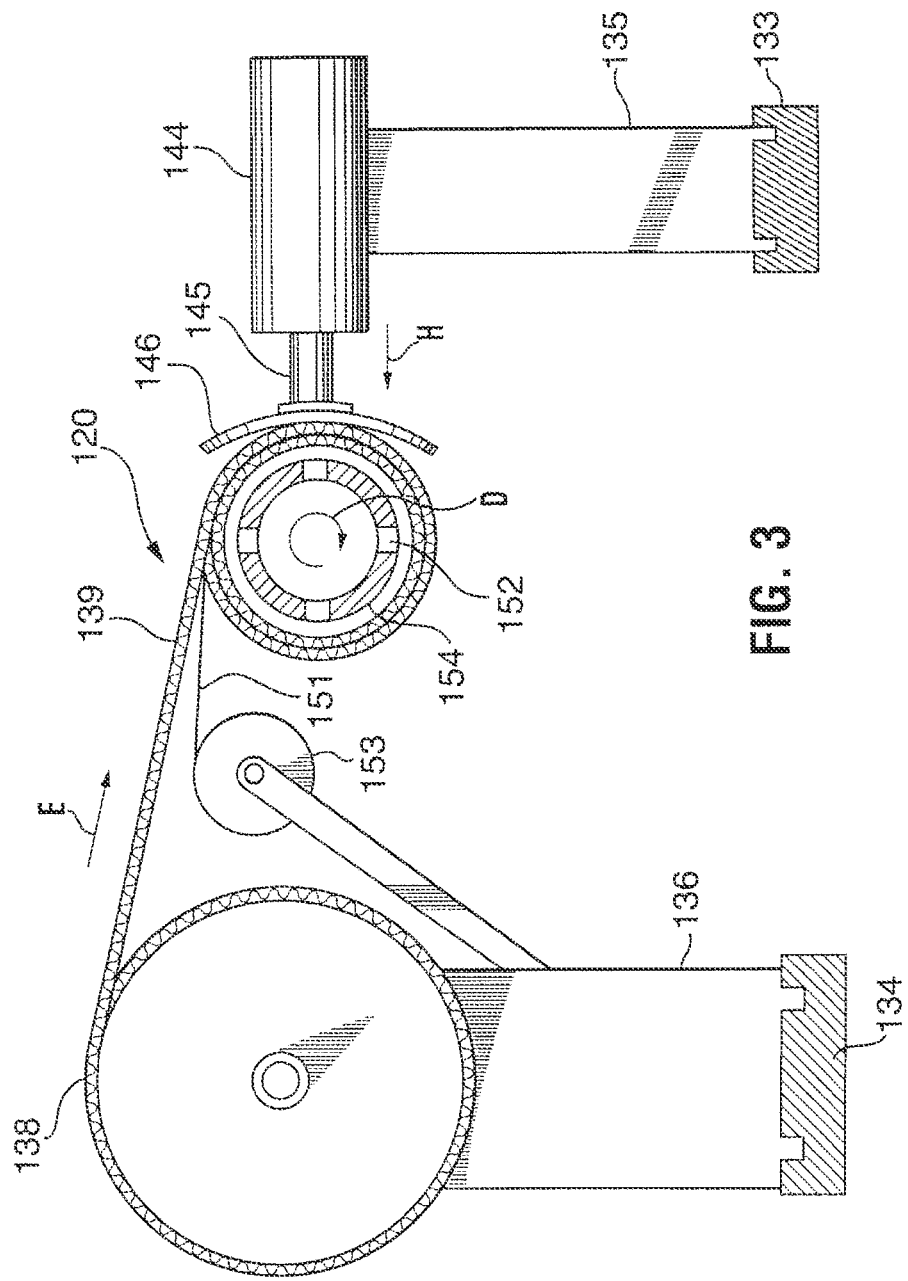
FIG. 3 is a diagrammatic sectional elevation view taken approximately along line 4-4 in FIG. 1.

It is usually desirable to mount a single-layer tubular metal mesh foundation member 154, not shown in FIGS. 1 and 2 but shown in FIG. 3, about at least the apertured portion 152 of the pipe between the head stock and tail stock of lathe 120. The metal mesh foundation 154 may be mounted on section 152 of the pipe before or after the pipe is mounted in lathe 120.

The next step in the inventive method is to wrap a plurality of metal fibers around section 152. In the illustrated embodiment, the plurality of metal fibers are arranged in a form that can be handled as a strip 139 and possibly withstand a pull tension. For example, in one embodiment the metal fibers may be in the form of metal wool, for example in one embodiment, a compressed, felt-like filter wool. The wool may be made of ordinary steel fibers, stainless steel fibers, or other metal (e.g. brass) fibers. The best operational life is usually achieved with stainless steel metal wool. With a metal wool filter material a passage size can be selected so that sand and like impurities cannot pass through the filter, but fluid flow is not cut off. The wool strip may have dimensions to suit a given application. Typically, the metal wool strip is formed from fibers having an average thickness of 85 microns and an average length of about one meter or less. The filter wool strip is often four inches (10 cm) wide and about 0.125 inch (0.3 cm) thick, but those dimensions are subject to substantial variation. A common diameter for a storage roll of the wool fiber strip is about 1.5 feet (0.5 meter) when the roll is full.

In one embodiment, the next step is to align the wool strip 139 at an acute angle X to the pipe axis, which is also lathe axis 142, at the end of the pipe onto which the wool is to be applied. The end of the metal filter wool strip is then affixed to one end of the aperture portion of pipe 150, by welding or other means. In FIG. 1, this has been done by mounting the wool strip storage roll 138 on carriage 136 with its axis 140 at the desired angle to position strip 139 to extend away from the pipe at the acute angle X. Lathe 120 is now actuated to rotate pipe 150 as indicated by arrow D, FIGS. 1 to 3. Rotation of pipe 150 pulls the filter wool strip 139 from its storage roll 138 in the direction of arrow E. Strip 139 is maintained under tension while being wrapped helically around apertured section 152. FIG. 1 shows an intermediate point in the method of wrapping of a first layer of the metal wool strip onto the pipe. Throughout the wrapping operation cylinder 144 and piston 145 urge plate 146 toward the pipe in the direction of arrow H (FIGS. 2 and 4) to aid the maintenance of tension in strip 139 and assure firm packing of layers of the strip around the pipe.

A first layer of the filter wool strip 139 is wound onto the apertured section 152 of pipe 150 throughout its length L. Throughout this operation, strip 139 should be maintained under tension. Plate 146 and its operating mechanism 144, 145 may be sufficient for this purpose; however, some drag on the rotation of the wool supply roll 138 or other means for assuring maintenance of tension on strip 139 may be necessary. Throughout the winding of all layers of the metal wool strip onto the pipe 150, the carriages 135, 136 should be moved along paths parallel to the pipe (see arrows F and G) so that a uniform helical winding is affected. That is the purpose of guide rails 133 and 134 and their engagement with carriages 135 and 136, respectively.

When a complete first layer of the metal wool strip 139 has been wound tightly onto the full length L of the apertured pipe section 152, the direction of movement of carriages 135 and 136, which has been from left to right as seen in FIG. 1, is reversed. Thereafter, a second layer of filter wool is tightly, helically wound onto the apertured pipe. When the second layer is complete, the direction of movement of the carriages 135 and 136 is again reversed and a third layer is started. The alternate, back-and-forth carriage movements are repeated, with pipe 150 rotating continuously in lathe 120, until the desired number of helical layers of metal wool are superimposed upon each other around the perforate section 152 of pipe 150. The number of layers used is a matter of meeting the filter requirements for a given application; preferably, there should be at least five layers and often as many as ten layers, fifteen layers, or even more. Because the lathe continues to rotate in the same direction throughout the process, while the carriage 136 moves the strip back and forth, each alternate wrapped layer will be helically wound in a direction opposite to the one applied directly therebelow, such that the layers overlap in a criss-crossing manner.

A fluid tracing filament 151 is also wrapped about the perforated section 152. A fluid tracing filament, also called a bio-tracer, is a substrate that carries a unique tracer that is picked up from the substrate by fluid passing thereby, carried to surface with the fluid and can be detected at surface to provide information concerning the well such as type of fluids produced, location of production, etc.

Fluid tracing materials may include a tracer embedded in a carrier such as a polymer resin. The carrier is a solid and is readily handleable such that it can be placed in a screen in a position to retain the tracer carried therein also in that position. The resin is selected to substantially withstand downhole conditions. The resin can be water soluble, water insoluble, formable in various ways, etc. It may be an advantage to make use of water based resins for the water soluble tracers. One reason for this is that the tracers are more easily distributed into a hydrophilic resin than a hydrophobic resin.

The tracers can offer various operational attributes. They can have selected solubility, a selected mode of detection, a selected response to incorporation in a carrier substrate, etc. Separate tracers exist for hydrocarbons and water, including for high temperature liquids (i.e. steam) vs. lower temperature tracers, for gas/condensate vs oil, etc. A tracer can, therefore, be selected to only be picked up by water and/or hydrocarbon. As such, if it is desired to monitor for water flow separately apart from oil flow, a particular tracer can be employed to only be picked up and carried in water flow but not in oil. Of course, the selection of oil monitoring over water, steam over liquid water, etc. is also possible, as desired.

The tracers can be detectable in various ways. Tracers can be radioactive, non-radioactive, chemically detectable as by use of laboratory or onsite analysis such as by chromatography, for example as by use of gas chromatography, etc.

Tracers can be incorporated into the polymer structure in any of various ways. The tracers, for example, tracers may be mechanically distributed as salt crystals in the polymer matrix, may be chemically incorporated or a combination of both cases may be possible.

The tracers may be picked up by solubilization, erosion, chemical reaction, etc. For example, chemically bound tracers may be released through hydrolyses either as the tracer itself or as derivatives of the tracer when the polymer is exposed to water at high temperature.

The rate of tracer pick up depends on a number of factors including, filament surface area and geometry of that surface exposed to the fluid, fluid temperature, fluid composition, fluid pressure and the mode of tracer infiltration to the carrier.

Generally, tracers that are chemically bound will be released at a slower rate than a tracer that is present as salt particles only. Chemically binding a tracer into the carrier, therefore, extends the lifetime of the tracer source. In cases where a long release period is desirable, a chemically bound tracer/matrix may be preferable to other options.

In one example, fluid tracing materials useful to form a fluid tracing filament are available from Resman AS (Trondheim, NO). As an example, a fluid tracing material may include a tracer carried in a polymer formed of melamine formaldehyde (MFR) condensate. The tracer may be mixed into the MFR solution before hardening with a suitable hardener. The condensate solution is commercially available from suppliers such as Dynea ASA, Norway, and is a reaction mixture of melamine, formaldehyde, methanol and water. It may also contain additives such as stabilizers, fillers, plasticizers and/or colorants. In one embodiment, the original content before condensation is 25-40% melamine, 25-35% formaldehyde and 1-10% methanol. The hardener can be formic acid or other products from the supplier. One possible product is Prefere 4720™ with addition of 10% (w/w) of the hardener Prefere 5020™ from Dynea ASA. The condensate solution can also be prepared by mixing dried powder of the condensate with water. The dried powder is available from Dynea ASA or other suppliers and is made by spray drying of a condensate solution with the same original composition of ingredients as listed above. One possible resin powder product is Dynomel M-765™ from Dynea ASA. The tracer may be mixed into the condensate solution using a mechanical blender before the hardener is mixed in. In one embodiment, after embedding the tracer in the carrier material, the material is cured under heat, for example, in a curing oven. The tracer release rate from this MET/tracer system will depend on the surface and geometry of the MFR exposed to the fluid. The release rate of tracer will further be influenced by parameters such as temperature, fluid composition and pressure. The MFR will tolerate a large fraction (in %) of tracer compound and still maintain acceptable mechanical properties. Typical tracer loading will be 5-20 weight % A. A standard temperature/pressure range where the MFR system according to the present invention may be used will be up to 120° C. and 600 bar.

Some tracers such as amino naphthalene sulfonic acids and fluorescein will react with formaldehyde and melamine in the condensate solution. The chemical reaction may be enhanced by applying heat. These tracers will be incorporated into the polymer structure after hardening.

Of course, other tracers and substrates may be employed, the foregoing being only an example.

For example, urea formaldehyde resin was also tested as carrier for the water tracers. This resin type was determined to be much less stable to water at elevated temperatures than MFR.

A more hydrophobic resin like polymethylmethacrylate was also tested as a carrier, but it was more difficult to disperse the tracer particles evenly in the resin.

The fluid tracing filament can be wrapped about the base pipe at any stage in the process before, with or after wrapping of the wool.

If desired, the filament may be applied only with a portion of the total wool applied to the base pipe. The filament may be applied to the base pipe above or below (as shown) the strip of wool 139.

In one embodiment, the filament is wrapped with wool strip 139, as it is wound onto the apertured section 152 of pipe 150 throughout at least a portion of its length L. Throughout this operation, the filament should be maintained under tension. Generally, the tension is generally equal with that of the strip. In one embodiment, the filament is wrapped with the wool strip over at least two lengths of the apertured section. As such, the tracer carrying filament is present over substantially the full length of the filtering area of the screen and in at least two helical winds, one in a first direction of travel and one in a second direction of travel. Because the filament is being wound with the strip, as the strip is applied to the base pipe, the filament will be applied in at least two helical directions such that in the final screen, the filament is at least in part surrounded by (embedded in) the filter fibers and applied with regular spacing between each adjacent wrap such that they become criss-crossed as the second helical wind is applied over the first. Because the filament is wrapped with the filter strip, the filament wraps are spaced apart with filter fibers between. The wrapping process ensures that the filament is substantially consistently distributed throughout the possible fluid path through the filtering medium, both along the length and through at least a portion of the radial thickness of the filtering area, such that at least some parts of the filament are certainly to be directly in the fluid path, even if the fluid is not passing evenly through the screen and even if the fluid is taking a substantially direct radial path through the screen, without much residence time.

In one embodiment, the fiber strip and the filament may be combined in a single feed reel. In another embodiment, the filament is held in a supply, such as reel 153, separate from the reel of the wool strip, but is carried on carriage 136 and allows the filament to be in position adjacent the strip just before the step of wrapping on the base pipe so that they are applied together. For example, the filament may be fed into the wrapping process and carried along with the pulling tension of the wool until a sufficient amount of the filament is applied. In one embodiment, for example, the filament is introduced with the wool strip at an acute angle X to the pipe axis generally starting at an end of the length of the apertured section 152. The leading end of the filament can be affixed to the pipe or filter fibers or can simply be tucked into the wraps of the screen. In FIG. 1, this has been done by mounting the reel 153 on carriage 136 with its axis at the desired angle to position filament 151 to extend away from the pipe at the acute angle X. Lathe 120 is actuated to rotate pipe 150 as indicated by arrow D, FIGS. 1 to 3, and this pulls the filter wool strip 1139 and the filament 151 from their storage rolls simultaneously in the direction of arrow E. Strip 139 and filament 151 are maintained wider tension while being wrapped helically around apertured section 152. FIG. 1 shows an intermediate point in the method of wrapping of a first layer of the metal wool strip onto the pipe with the filament underlying the strip. Tension may be maintained by plate 146 and its operating mechanism 144, 145 may be sufficient for this purpose and/or some drag may be placed on the rotation of the wool supply roll 138 and reel 153. Throughout the winding of all layers of the filament and the string onto the pipe 150, the carriage 136 should be moved along a path parallel to the pipe (see arrow G) so that a uniform helical winding is affected.

When a complete first layer of the metal wool strip 139 and filament 151 has been wound tightly onto the full length L of the apertured pipe section 152, the direction of movement of carriage 136, which has been from left to right as seen in FIG. 1, is reversed. Thereafter, a second layer of filter wool and filament is tightly, helically wound onto the apertured pipe. When the second layer is complete, the direction of movement of the carriages 135 and 136 is again reversed and a third layer is started. The alternate, back-and-forth carriage movements are repeated, with pipe 150 rotating continuously in lathe 120, until the desired number of helical layers of metal wool and filament are superimposed upon each other around the perforate section 152 of pipe 150. The filament wrapping may be discontinued while the metal strip continues to be laid down.

Filament 151 is of a thickness and strength to permit wrapping about the base pipe. In particular, filament 151 has an elongation to break selected to permit the filament to withstand the tension wrapping conditions to be used in the manufacturing process. At the same time, the filament may be selected to be incorporated into the screen without adversely affecting its filtering characteristics. In one embodiment, the filament is in the form of a coupon, narrow strip or line such as having a thickness to width ratio of 1:3 to 1:1. Alternately, the tracer material may be embedded in the wool strip.

In one embodiment, filament 151 is a line having a cross section with substantially a 1:1 thickness to width ratio (i.e. circular, square, triangular, etc. cross section) of 1 to 5 mm, for example, about 2 to 3 mm in diameter.

In one embodiment, two filament types are used in each screen: a water tracing filament and an oil tracing filament. The amount of tracing filament installed in the screen may depend on the duration to be monitored and the volumetric flow of the oil or water to be monitored. A 5 to 50% filament fill of the available volume is sought, amounts greater than that tending to have less than acceptable sand screening. In one embodiment, a 15 to 20% filament fill was found to be particularly useful, while the remaining volume was filled with filtering material. For example, in one screen with a 5.5" base pipe diameter and a 10 ft filtering area length, about 100 m of a water tracing filament and 100 m of a oil tracing filament were used to fill 17% of the available volume, with the remainder volume being occupied by filter fibres. Each filament type was applied in a discreet length and in one embodiment, a plurality of filaments were applied in spaced side-by-side relation. In one embodiment, four filaments, two of oil tracing character and two of water tracing character are fed onto the screen, at the same time.

Figure 4:
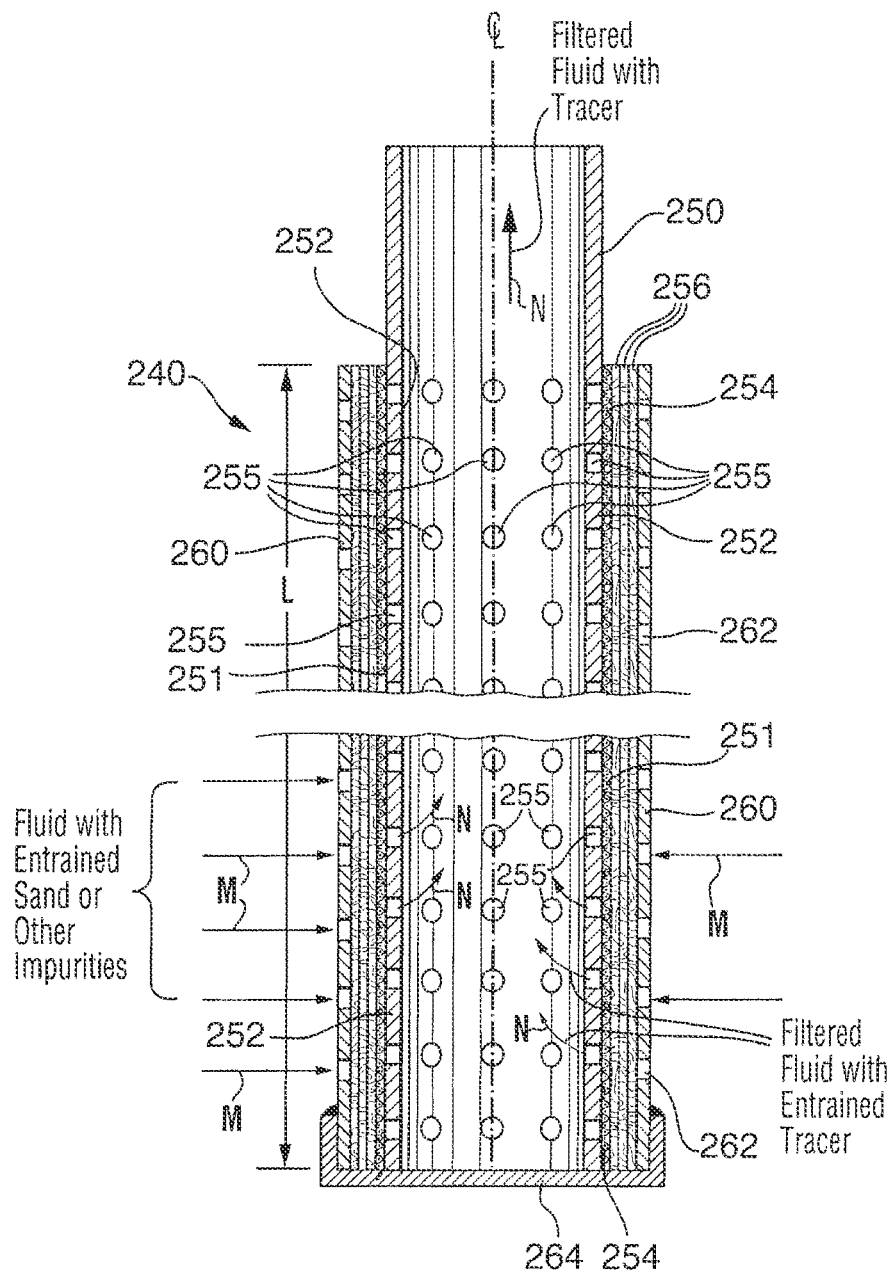
FIG. 4 is a sectional view of a wellbore screen constructed in accordance with one embodiment of the invention.

FIG. 4 is a longitudinal sectional view of a wellbore screen 240 constructed in accordance with the invention. It includes a section of apertured base pipe 252 having a length L formed as part of or connected to a pipe 250 of the production string.

In this embodiment, there is a tubular mesh 254 around the exterior of the base pipe 252, throughout the length L in which there are perforations 255 extending through the wall. Outwardly from the mesh 254 is an intermediate layer including a plurality of layers 256 of metal wool fibers disposed in overlapping relation to each other. Layers 256 are each formed from a strip of metal wool fibers wound helically, under tension, around the apertured pipe 252 in a manner such as that described above. While three layers are shown in FIG. 4; fewer or more layers of filter wool may be used, depending on the application in which filter 240 is used. The wool layers filter out sand and other impurities from fluid passing into the interior of the filter's base pipe and out through pipe 250.

Along with layers 256, a fluid tracing filament 251 is also wrapped about pipe 252. In this embodiment, two filaments 251 are incorporated in a length of the first layer wrapped onto pipe 252, but they can be installed in other or further layers, as desired.

A tubular shell 260, having a length L and a plurality of apertures 262, such as perforations, channels, underlays, or slots, fits tightly over the outermost layer of the intermediate layer, in this case the outermost layer is of filter wool 256. A cap 264 may be provided at the end of pipe section 252 opposite the outlet afforded by pipe 250.

In operation of filter 240 of FIG. 4, the screen is secured in a production string. Other similar screens and/or screens without tracing filaments may be installed along the string. Fluid with sand or other entrained impurities enters apertures 262 in shell 260 as indicated by arrows M. The fluid passes through the multiple layers 256 of filter wool, leaving the entrained sand and other impurities behind. The filtered fluid enters the central, open area in pipe 252 through its apertures 255 and flows out of the filter, as indicated by arrows N. Of course, a pressure differential across the plural layers of filter 240 is necessary for sustained, continuous flow, but that is necessary for virtually any filter. Moreover, the flow is reversible, with the same filter effect.

The mesh 254 between pipe 252 and the plural layers 256 of filter wool serves a definite purpose in filter 240. If there is no mesh 254, the fluid may tend, over time, to develop relatively larger passages between at least some of the outer apertures 262, in shell 260, and the inner apertures 255, in pipe 252. That passage enlargement may reduce the effectiveness of filter 240, with the result that less sand and other impurities are filtered out of the fluid traversing the filter.

At the same time, tracers from the fluid tracing filaments 251 may, if they are soluble relative to the fluid, be picked up by the passing fluids and carried to surface in flow N. The screen, therefore, also provides a monitoring system, wherein a unique tracer can be used that allows individual zones in a well where the screen has been installed to be monitored for amount and/or type of production flow. For example, a plurality of screens can be installed, each with a unique tracer in the fluid tracing filament installed therein. The screens with unique tracers can be installed at known locations in the well and the fluids produced therethrough can be monitored as to flow rate and content by observation of the tracer content in the fluid at surface. The tracers are designed to be released to the target fluid during a certain period that can be hours, days, months or years depending on the monitoring objectives.

Unique tracers may be placed in each zone, or even in each completion string joint to obtain the required downhole resolution. For example, in a well with three zones, at least three different tracers T1, T2, T3, may be used in screens intended for installation one tracer type for each zone. If production arises from all zones, all three tracers T1, T2, T3 are present in the fluid arriving at surface. However, if only one or two of the tracers are detected in the produced fluids at surface, this indicates that one zone is not producing and the location of the non-producing zone is apparent, depending on which tracer is not present in the produced fluids.

The filaments may be selected to release their tracers to the target fluid, oil or water, following certain events or over a certain period of time depending on the monitoring objectives.

Samples of the well fluids are taken at surface for analysis. Commingling of several zones or wells does not jeopardize the results. Analysis is done and results are available quickly.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

We claim:

1. A method for producing a wellbore screen, the method comprising:
    forming an intermediate layer of a filter tube, including both wrapping a metal wool fiber strip and wrapping a fluid tracing filament, about an apertured base pipe in a helical arrangement under tension;
    positioning the filter tube within a long bore of an outer apertured sleeve; and
    securing the outer apertured sleeve and the filter tube together.

2. The method of claim 1 wherein the metal wool fiber strip and the fluid tracing filament are wrapped simultaneously about the apertured base pipe.

3. The method of claim 1 wherein the apertured base pipe has an aperture section and the metal wool fiber strip and the fluid tracing filament are wrapped simultaneously about the apertured base pipe over at least two lengths of the apertured section.

4. The method of claim 3 wherein the fluid tracing filament is applied over at least two lengths in a first helical winding in a first helical direction and a second helical winding in a second helical direction such that the first helical winding and the second helical winding becomes criss-crossed along the length.

5. The method of claim 1 wherein at least some amount of the fluid tracing filament is surrounded by the metal wool fiber strip.

6. The method of claim 1 wherein the fluid tracing filament is in the form of a line having a thickness to width ratio of 1:3 to 1:1.

7. The method of claim 1 wherein the line has substantially a 1:1 thickness to width ratio and of 1 to 5 mm in diameter.

8. The method of claim 1 wherein the fluid tracing filament is a water tracing filament.

9. The method of claim 1 wherein the fluid tracing filament is an hydrocarbon tracing filament.

10. The method of claim 1 further comprising incorporating a second fluid tracing filament in the intermediate layer.

11. The method of claim 10 wherein the fluid tracing filament is either an hydrocarbon tracing filament or a water tracing filament and the second fluid tracing filament is the other of an hydrocarbon tracing filament or a water tracing filament.

12. The method of claim 10 wherein incorporating the second fluid tracing filament in the intermediate layer includes wrapping the second fluid tracing filament about the apertured base pipe in a helical arrangement under tension simultaneously with the fluid tracing filament.

13. The method of claim 1 wherein the fluid tracing filament is 5 to 50% of metal wool fiber strip volume in the intermediate layer.

14. The method of claim 1 wherein wrapping includes securing a starting end of the metal wool fiber strip to the apertured base pipe; rotating the apertured base pipe about its axis to apply a pulling tension to the metal wool fiber strip to draw the metal wool fiber strip in a helical orientation onto the apertured base pipe; and incorporating the fluid tracing filament with the metal wool fiber strip to also be pulled onto the apertured base pipe as it rotates.

15. The method of claim 1 wherein the metal wool fiber strip and the fluid tracing filament are each carried on a supply reel that rides along an axis parallel to the apertured base pipe.

* * * * *